United States Patent
Lieb et al.

[15] 3,688,143
[45] Aug. 29, 1972

[54] MULTI-DIODE CAMERA TUBE WITH FIBER-OPTICS FACEPLATE AND CHANNEL MULTIPLIER

[72] Inventors: Albert Lieb, 7919 Betlinshausen; Hans-Christian Niehuus, 7911 Ay/Iller, both of Germany

[73] Assignee: Licentia Patent-Verwaltungs-GmbH, Frankfurt (main), Germany

[22] Filed: Feb. 16, 1970

[21] Appl. No.: 11,731

[30] Foreign Application Priority Data

Feb. 15, 1969 Germany..........P 19 07 649.4

[52] U.S. Cl....................................313/67, 313/95
[51] Int. Cl..........................H01j 31/48, H01j 31/28
[58] Field of Search.......313/65 T, 65 AB, 66, 65, 68

[56] References Cited

UNITED STATES PATENTS

| | | |
|---|---|---|
| 2,887,596 | 5/1959 | Van Rijssel et al..........313/65 |
| 3,039,017 | 6/1962 | Brown et al..............313/65 X |
| 3,403,284 | 9/1968 | Buck et al....................313/65 |
| 3,546,514 | 12/1970 | Blamoutier..................313/65 |
| 3,440,476 | 4/1969 | Crowell et al............313/66 X |
| 3,458,782 | 7/1969 | Buck et al..................317/235 |
| 3,585,439 | 6/1971 | Schneeberger....313/65 AB X |

Primary Examiner—Robert Segal
Attorney—Spencer & Kaye

[57] ABSTRACT

A multi-diode camera tube comprises means for receiving the radiation of the picture to be transmitted and emitting electrons according to the picture to be transmitted, these electrons being accelerated in an electrical field and impinge on a multi-diode plate to cause operation of the diodes in accordance with the picture content. The receiving means may be a photocathode or a secondary emission multi-channel plate depending on the radiation used for the picture.

1 Claim, 3 Drawing Figures

PATENTED AUG 29 1972 3,688,143

Inventors.
Albert Lieb
Hans-Christian Niehuus
BY Spencer & Kaye
ATTORNEYS

3,688,143

MULTI-DIODE CAMERA TUBE WITH FIBER-OPTICS FACEPLATE AND CHANNEL MULTIPLIER

BACKGROUND OF THE INVENTION

The invention relates to a multi-diode camera tube.

Apart from the previous camera tubes, such as vidicon, plubicon, image orthicon, image isocon, the so-called multi-diode vidicon has recently become known. In comparison with the former camera tubes, the multi-diode vidicon has the advantage of low inertia, insensitivity to highlights, great mechanical strength and a longer operating life. In comparison with the SEC vidicon, the image orthicon and the image isocon in particular, however, there is the disadvantage of relatively low sensitivity.

SUMMARY OF THE INVENTION

It is an object of the invention to provide a camera tube having the characteristic of low inertia independence of highlights, high mechanical strength and a long life with simultaneous high sensitivity.

According to the invention there is provided a multi-diode camera tube comprising means for receiving the radiation of the picture to be transmitted and emitting electrons according to the picture contents, means for producing an electrical field for accelerating said emitted electrons and a multi-diode plate on which said emitted electrons impinge and cause operation of the diodes of said multi-diode plate in accordance with the picture content.

Further according to the invention, there is provided a multi-diode camera tube comprising a photocathode on which light of the picture to be transmitted falls and which emitts electrons according to the picture content, means for producing an electrical field for accelerating said emitted electrons and a multi-diode plate on which said emitted electrons impinge to discharge the diodes of said multi-diode plate in accordance with the picture content.

BRIEF DESCRIPTION OF THE DRAWINGS.

The invention will now be described in greater detail, by way of example, with reference to the accompanying drawings, in which.

DESCRIPTION OF THE PREFERRED EMBODIMENTS

Figure 1:
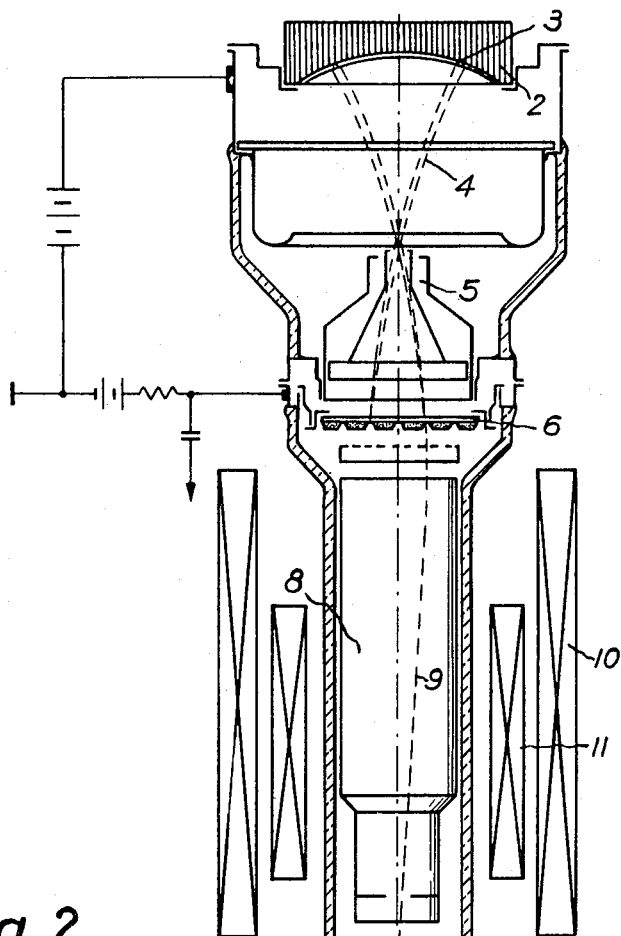
FIG. 1 is a sectional diagrammatic view of one form of multi-diode camera tube in accordance with the invention.

Referring to FIG. 1, in a tube envelope 1, on a fiber-optic disc 2, is a photocathode, for example a multi-alkali photocathode 3. The picture to be transmitted is reproduced on the fiber-optic input disc 2. Electrons 4 are released from the photocathode 3 according to the light intensity in each picture element. These electrons 4 are accelerated by the voltage applied to the anode 5, and reproduced electron-optically, on the multi-diode target 6. The multi-diode target 6 consists, for example, of a silicon plate of N-type conductivity, about 15 $\mu$, in which there is a pattern of about 500,000 islands of P-type conductivity per $cm^2$ at the side remote from the photocathode. These P-N junctions or P-N diodes are operated in the reverse direction by applying a positive potential of about 10 V to the plate of N-type conductivity in comparison with the potential of the cathode 7 of the scanning beam system 8, and bringing the islands of P-type conductivity to the potential of the cathode by means of the scanning electron beam 9.

The focusing and deflection of the scanning beam 9 is effected in the usual manner by means of the scanning and focusing coils 11 and 10 respectively. The electrons 4 emitted by the photocathode 3 and penetrating into the target produce a plurality of pairs of electrons and holes. For every kV of the applied accelerating voltage, about 300 pairs of electrons and holes are produced per electron in silicon for example. The minority charge carriers released in the silicon of N-type conductivity by the penetrating photo-electrons diffuse across the P-N junction situated in their vicinity and discharge the capacitor formed thereby in the intervals between two successive scannings. The scanning electron beam 9 restores the sides of the diodes of P-type conductivity to the cathode potential. The charging current flowing in the course of this is utilized as a picture signal.

Figure 2:
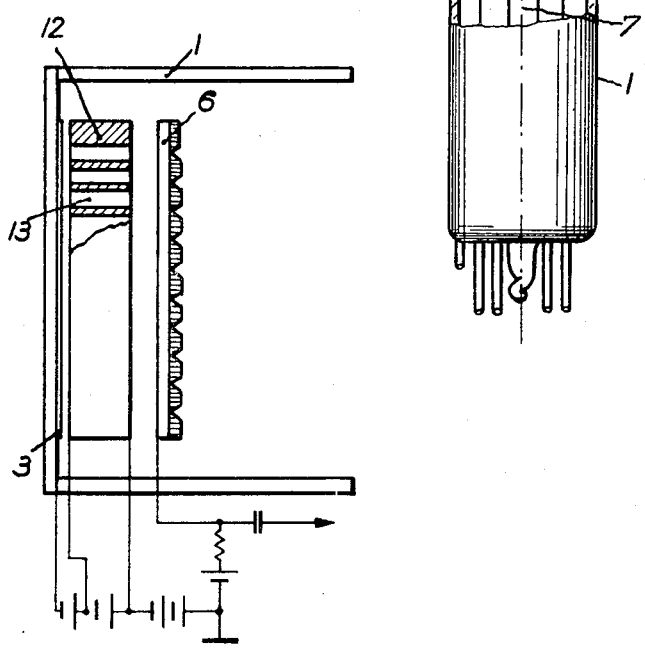
FIG. 2 is a sectional diagrammatic view of part of another form multi-diode camera tube in accordance with the invention.

A further example of the invention is illustrated in FIG. 2. In this example, the photo-electrons released by the photocathode 3 are first multiplied by means of a known multi-channel secondary-emission plate. The multi-channel plate 12 consists of a glass plate of a suitable material in which there are a plurality of through holes 13 with conducting side walls having a diameter of about 10 to 20 $\mu$. A voltage is applied to the conducting end faces in order to accelerate the secondary electrons. The multi-diode disc 6 is in the immediate vicinity of the multi-channel plate 12. The electrons emerging from the cathode 3 or multi-channel plate 12 are accelerated and focused by means of a positive voltage applied to the multi-channel plate 12 and to the multi-diode plate 6. The opposite plane faces of the multi-diode disc and of the multi-channel plate produce a homogenous electrical field. Otherwise, the construction of the tube corresponds to the example shown in FIG. 1. The present embodiment in FIG. 2 has the advantage over that in FIG. 1 of greater sensitivity. The greater sensitivity results from the very high multiplication of the electrons emitted by the cathode, in the multi-channel plate. For applications in which even greater sensitivity and a high resolution are necessary, the invention provided for placing the cathode, not opposite the input of the multi-channel plate in the immediate vicinity thereof, as shown in FIG. 2, but providing an anode 5, which produces a inhomogeneous electrical field between cathode 3 and multi-channel plate 12, in accordance with the example shown in FIG. 1. The anode 5 accelerates the electrons emitted by the cathode and reproduces them electron-optically on the multi-channel plate 12.

The camera tube according to the invention is also particularly suitable for reproducing the radiation pattern of an ultraviolet or X-ray radiation. For this kind of application, the use of a photocathode may be dispensed with in order to simplify the device. The combination of the multi-diode plate and multi-channel plate is sufficient, because the incident ultraviolet or X-ray radiation releases so many electrons in the individual channels 13 of the multi-channel plate that adequate amplification is achieved.

In a further form of construction, the invention provides for protecting the sides of the multi-diode plate 6 adjacent to the photocathode from harmful influences during the manufacture or operation of the tubes by applying a protective layer 17 to this surface.

Figure 3:
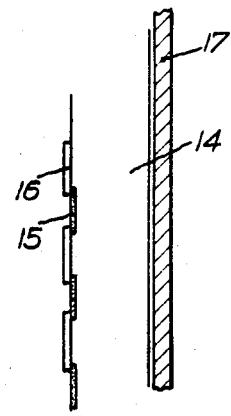
FIG. 3 is a sectional view of a multi-diode plate suitable for use in the camera tubes of FIGS. 1 and 2.

FIG. 3 shows the multi-diode plate 6 of such a form of construction. A plurality of P-N diodes 15 are provided on a thin silicon disc 14 of N-type conductivity. Silicon dioxide layers 16 covers the region of N-type conductivity between the diodes. There is a protective layer 17 at the side opposite the diodes and adjacent to the photocathode. This protective layer is so dimensioned that the energy of the incident electrons is not substantially reduced by damage to the multi-diode plate, for example disturbing absorption or chemical reaction at the surface of the silicon disc, is prevented. The layer consists of a vapor-deposited aluminum or gold layer for example.

A further advantageous possibility of achieving an adequate protective effect consists, according to a further development of the invention, in doping the side of the multi-diode plate adjacent to the photocathode so that an $N^+$-type of conductivity is formed. Such a conductivity is provided in any case in many multi-diode plates in order to obtain a low recombination rate for the charge carriers. This is too thin for a protective action, for which reason it is proposed that this layer should be appropriately reinforced, preferably being made thicker than 1 $\mu$.

It will be understood that the above description of the present invention is susceptible to various modification, changes and adaptations.

What is claimed is:

1. A multi-diode camera tube comprising: a fiber-optic disc having a concave light output surface; a photocathode on said concave surface for receiving the radiation of the picture to be transmitted and emitting electrons according to the picture content; a multi-diode target disposed for receiving such electrons and composed of a silicon plate of N-type conductivity, a pattern of p-type conductivity material within said plate and a reinforced surface region of $N^+$-type conductivity, with the region of $N^+$-type conductivity facing in the direction of said photocathode; an anode mounted between said photocathode and said multi-diode target; means for applying a voltage to said anode to establish thereby an electric field for accelerating said emitted electrons; a secondary emission multi-channel plate including a plurality of through holes with conducting side walls, said multi-channel plate being mounted between said anode and said multi-diode target for multiplying, accelerating and supplying said electrons to said multi-diode target; means for producing a scanning electron beam for scanning the side of said multi-diode target which includes the pattern of P-type conductivity material; and means situated between said multi-diode target and said scanning beam means for producing a focusing magnetic field for said scanning electron beam.

* * * * *